United States Patent [19]
Henderson et al.

[11] 3,981,535
[45] Sept. 21, 1976

[54] SINGLE RETRACTOR CONTINUOUS LOOP RESTRAINT SYSTEM

[75] Inventors: Cyril Henderson, Woodland Hills; Albert R. Close, Sylmar, both of Calif.

[73] Assignee: American Safety Equipment Corporation, Encino, Calif.

[22] Filed: May 27, 1975

[21] Appl. No.: 580,766

[52] U.S. Cl................................ 297/389; 297/388
[51] Int. Cl.² ........................................ A47B 35/00
[58] Field of Search .............. 24/196, 77; 297/389, 297/388; 280/150 SB

[56] References Cited
UNITED STATES PATENTS

| | | | |
|---|---|---|---|
| 3,213,503 | 10/1965 | Carter et al. | 24/196 |
| 3,256,576 | 6/1966 | Klove, Jr. et al. | 24/196 X |
| 3,449,800 | 6/1969 | Fisher | 24/77 R |
| 3,798,711 | 3/1974 | Cousins | 24/196 |
| 3,847,434 | 11/1974 | Weyman | 297/389 |
| 3,888,541 | 6/1975 | Stephenson | 297/389 X |

*Primary Examiner*—James T. McCall
*Attorney, Agent, or Firm*—Poms, Smith, Lande & Glenny

[57] ABSTRACT

A safety belt system includes a continuous loop of webbing which is anchored at one end to the vehicle floor and anchored at the other end to the roof or upper part of the vehicle. A buckle is mounted on the other side of the seat from the first-mentioned floor anchor, and a connector which is positionable along the webbing includes a tongue plate which mates with the buckle. The system has been improved by the provision of the combination of including limiting means on the connector for allowing the webbing to pass only in a direction to shorten the portion between the floor anchor and the buckle over the lower torso of the user and to lengthen the portion of the webbing between the retractor and the connector over the upper torso. The retractor is more powerful than a normal retractor to pull the webbing through the limiting means. The retractor may further include a tensionless feature to relieve the force from the retractor on the webbing. The system may further include override means to override the limiting means and allow the webbing to pass through the connector in both directions. The override means includes a grip which is held when the connector is held and which releases the override means when the connector is inserted in the buckle. The grip means may include a bar extending between part of the connector. The webbing passes between the bar and the part of the connector to be gripped thereby. The bar is movable to override the gripping of the webbing.

12 Claims, 4 Drawing Figures

U.S. Patent  Sept. 21, 1976  3,981,535
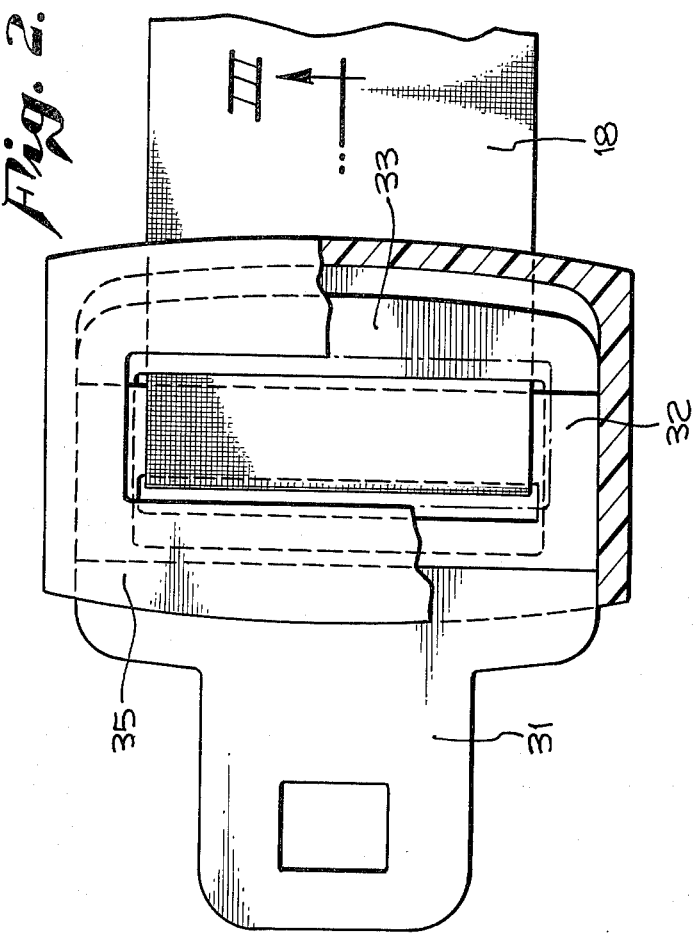
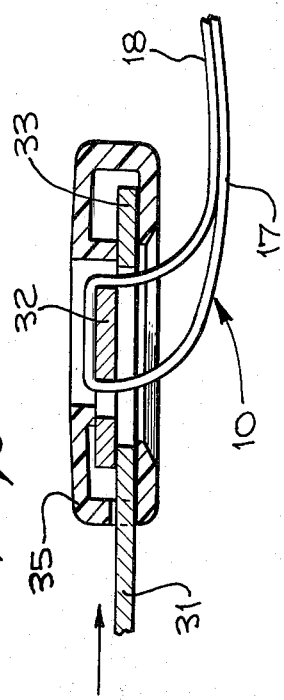
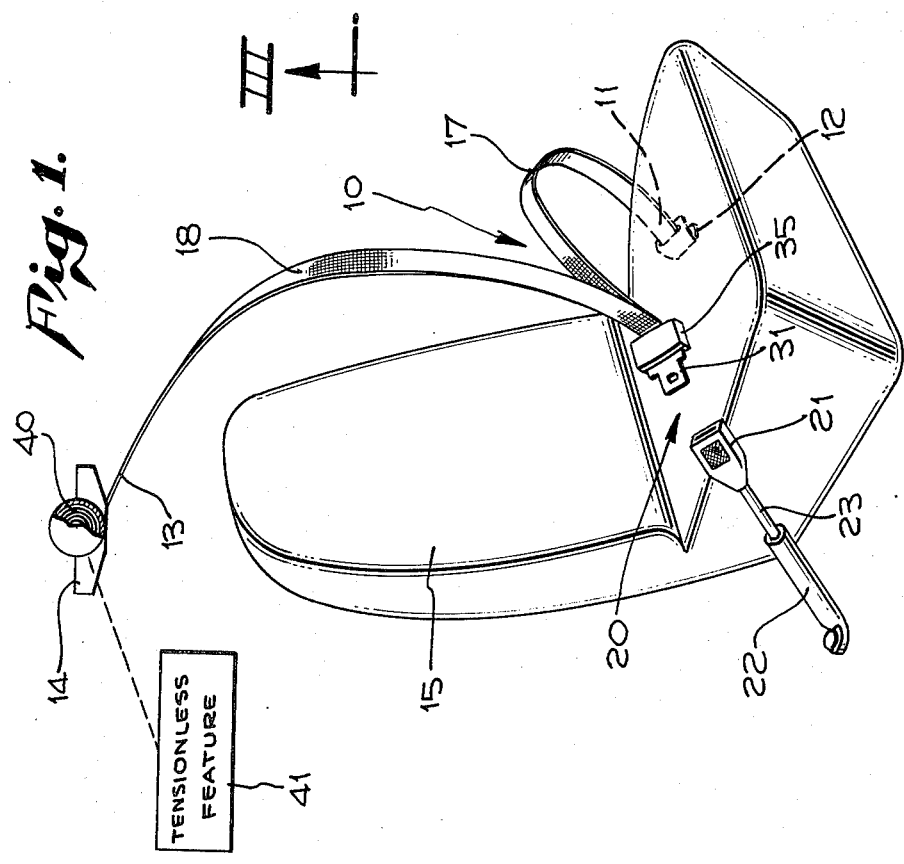
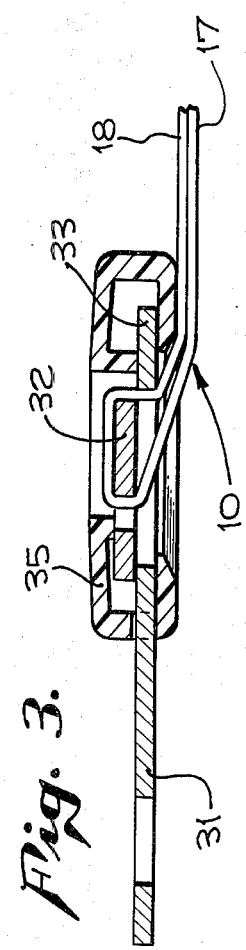

SINGLE RETRACTOR CONTINUOUS LOOP RESTRAINT SYSTEM

BACKGROUND OF THE INVENTION

The standard vehicle restraint system has a lap belt portion and a shoulder belt portion. It is considered advantageous to have the shoulder belt section rather loose to allow the vehicle occupant freedom of movement of his upper torso. It is not considered advantageous to allow freedom of movement to the lower torso, and the lap belt on conventional vehicle restraint systems is adapted to hold the lower torso tightly in the vehicle seat.

Many systems include two retractors, one for the lap belt and the other for the shoulder belt. The belts are generally attached to a connector plate which can be buckled into a floor buckle. But, retractors are somewhat expensive, and systems utilizing only a single retractor are advantageous. In such systems, one end of the webbing is attached to the retractor, and the other end is secured to an anchor on the vehicle. A connector which is free to move along the webbing is buckled into a floor mounted buckle, and the webbing is positioned across the lap and shoulder of the vehicle occupant.

One problem with such a system is that the length of the lap belt portion and the shoulder belt portion is not fixed, and the webbing can slip through the connector. As discussed above, it is especially important that the lap belt portion be tight, and slipping of the webbing through the connector after buckling may permit the occupant to move his lower torso and loosen the lap belt portion.

It has been suggested to have a one-way fitting for the webbing that allows passage of the belt in a direction that tightens the lap belt portion and feeds the webbing into the shoulder harness section. See, for example, Sharp, U.S. Pat. No. 3,258,293 (1966). Although the one-way fitting prevents slippage of the webbing which would loosen the lap belt portion, the system itself does not prevent buckling with a loose lap belt. The occupant must pull on the buckle from the shoulder harness portion to tighten the lap belt portion. Although many users will follow these instructions, one who does not is subject to increased risk in the event of a crash.

It has been recognized that it is possible to use a retractor to tighten a portion of the loop or webbing. See, for example, Carter, U.S. Pat. No. 3,606,455 (1971). When the shoulder harness section is attached to the retractor, which, as discussed above, is advantageous from a safety point of view, different criteria than those recognized in Carter must be satisfied. Normal retractors are powerful enough only to wind loose webbing. The springs do not have enough force to pull the webbing through a frictioned connector. Therefore, it is an object of the present invention to provide a continuous loop restraint system for use in vehicles which will maintain the lap belt portion of the webbing in a tight condition. A further object of the present invention is to have a tight lap belt portion with the retractor attached to the shoulder harness portion in the upper part of the vehicle.

Although one-way connectors for restraint systems have been proposed, the prior art connectors either allowed some slipping between the various webbing portions, or they presented difficulties in adjusting the length of the various webbing sections. It is also important that the one-way feature in the connector be releasable so that the length of the lap belt portion can be adjusted. Therefore, it is another object of the present invention to provide for such adjustments in a manner that will not lead to slipping of the webbing in a wrong direction through the one-way connector when the connector is buckled but will permit movement in that direction prior to buckling to permit adjustments in the webbing lengths.

Another object of the present invention is to provide means whereby the lap belt is tightened automatically without even minimal effort required by the user. Still a further object of the present invention is to allow the above-stated objects to be met while permitting some freedom of movement of the upper torso to allow the vehicle occupant to move around slightly and to lean forward or to the side so that he can reach objects within the vehicle. It is a further object of the present invention to provide for automatic tightening of the lap belt portion while eliminating excess pull from the retractor on the shoulder harness.

These and other objects will become evident from the description of the invention.

BRIEF DESCRIPTION OF THE DRAWINGS

FIG. 1 is generally a perspective view showing the single retractor continuous loop restraint system of the present invention.

FIG. 2 is a plan view partially cut-away of the connector of the restraint system of the present invention.

FIGS. 3 and 4 are sectional views of the connector of the restraint system of the present invention taken through the plane III—III of FIG. 2. FIG. 3 shows the webbing being gripped by the connector, and FIG. 4 shows the override means allowing the webbing to pass through the connector in both directions.

DETAILED DESCRIPTION OF THE PREFERRED EMBODIMENT

The continuous loop restraint system of the present invention is shown generally in FIG. 1 and comprises a continuous loop of webbing 10 anchored at a first end 11 to the lower part of the vehicle at anchor fitting 12. The second end of the webbing 13 is anchored at the upper part of the vehicle by attachment to a retractor 14. In the exemplary embodiment in FIG. 1, the retractor 14 is mounted in the upper portion of the vehicle above the seat 15 in the roof of the vehicle, but the retractor could also be mounted to the side of the seat 15 with a fitting above the retractor so that webbing passes upward from the retractor to the fitting then diagonally downward across the user's chest.

Releasable anchor means releasably connect the central portion of the webbing to the lower part of the vehicle on the other side of the user than the first mentioned anchor. In the exemplary embodiment, the releasable anchor means 20 includes a connector 30 having a tongue plate 31 thereon. The tongue plate 31 is insertable into the buckle 21. The buckle 21 is connected to the vehicle at anchor 22 by means of a semi-rigid rod 23 that positions the buckle 21 in the location shown in FIG. 1.

The connector 30 attaches the central portion 16 of the webbing to buckle 21. It will be recognized that the connector generally divides the webbing 10 into two portions, a lap belt portion 17 which is the portion of the webbing between anchor 12 and connector 30. Lap belt portion 17 passes over the user's lower torso to hold the lower torso within the seat. The other part of the webbing is referred to as the shoulder belt portion 18 and extends between the retractor 14 and the connector 30. The shoulder belt 18 passes over the user's upper torso to prevent that part of the user's body from contacting the front of the passenger compartment during a crash.

The restraint system has been improved by providing the releasable connector with limiting means for allowing the webbing to pass therethrough only in a direction to shorten the webbing over the lower torso and lengthen the webbing over the upper torso. In the exemplary embodiment, the webbing 10 loops over bar 32 with the shoulder belt portion passing between bar 32 and the rear portion 33 of tongue plate 31. (FIG. 3) As discussed above, it is important to maintain the lap belt portion 17 tight, and the connector 30 should prevent the webbing passing through the connector in such a way that the lap belt portion 17 will be lengthened while the shoulder belt portion 18 is shortened.

Referring to FIG. 3, any force to the right on lap belt portion 17 pulls bar 32 against portion 33 of the tongue plate to snub the webbing therebetween. If, on the other hand, the lap belt portion is to be tightened, it can be seen that force to the right on the shoulder belt portion 18 has a tendency to move portion 33 to the right relative to the bar 32. This allows the webbing to be pulled through in the direction to lengthen the shoulder belt portion 18.

The improvement of the present invention also includes the provision of having means on the retractor for supplying more force to the webbing to pull the webbing through the limiting means. In the exemplary embodiment, the retractor 14 is supplied with a heavy duty spring 40 (FIG. 1) which pulls on the shoulder harness portion 18 to pull the webbing through the connector 30. In conventional safety belt systems, the retractors provide only enough force to wind the loose webbing on the retractor reel. Conventionally, the range of force is 0.2 – 1.5 lbs. Springs with greater forces are not used because they are thought to be unnecessary and cause discomfortable pull of the shoulder belt portion against the user's chest forcing him into the seat. Retractors having the conventional spring do not develop sufficient force to pull webbing through the connector. In the present invention, the addition of a spring having greater force provides sufficient means to automatically tighten the lap belt portion 17 by pulling on the shoulder belt portion 18. The amount of spring force required is dependent on the amount of frictional forces preventing the lap belt portion from tightening and can easily be determined by experimentation. However, in the preferred embodiment, the total spring force is 2.0 – 3.5 lbs.

The improved system may also comprise tensionless means to releive tension from the retractor on the webbing. In the exemplary embodiment, tensionless means 41 may be added to the retractor so that the force developed by spring 40 does not cause discomfort to the wearer from too great a pull from the shoulder webbing portion 18 against the upper torso of the user. Briefly, a tensionless feature allows the user to prevent continued tension from the retractor to the belt. A preferred tensionless feature which could be incorporated into the restraint system of the present invention is shown in Heath, U.S. Pat. No. 3,834,646 (1974). The feature, which is incorporated herein by reference, allows the user to relieve the tension from the retractor by pulling a short length of webbing from the retractor after the retractor has retracted all excess webbing. Thereafter, a short length of webbing is retracted and then further withdrawn to set the tensionless feature. Alternatively, a tensionless retractor such as Kuszynski, U.S. Pat. No. 3,682,412 could be used. In this manner, the harsh pull from the heavy spring 40 on the shoulder harness portion 18 is relieved.

It will also be recognized that the adjusting of the Heath retractor causes forces to be transmitted to shoulder belt portion 18 which adds force to assist in pulling the belt through the connector.

The connector may include override means to allow the webbing to pass in both directions through the limiting means. In the exemplary embodiment, the override means is shown generally in FIG. 4 and when operating slides bar 32 to the left relative to the tongue 31. This eliminates the hold on the webbing between bar 32 and the rear portion 33 of the tongue plate and allows the webbing to freely pass in both directions through the connector 30. The override means further includes hand held grip means which is held when the connector is held and which activates the override means when the connector is inserted in the buckle. Referring to FIG. 1, the grip 35 is held by the user when the restraint system is to be buckled. The grip is preferably formed of plastic and may have knurled sides (not shown) to assist in holding connector 30. The plastic grip 35 is rigidly connected to bar 32 which, as a load bearing member, is preferably formed of metal. Grip 35 and therefore bar 32 is free to move relative to tongue plate 31. When the connector is being buckled, the normal force on grip 35 slides it and bar 32 to the right relative to the tongue plate 31 allowing the connector to assume the FIG. 4 orientation. This allows the lap belt portion 17 to be lengthened so that it reaches over the user's lap. Concurrently, the FIG. 4 orientation presents even less resistance to pull by the shoulder harness portion 18 through the connector. Consequently, after the user has pulled the connector across his lap, while he is inserting connector 30 into buckle 21, any excess webbing in the lap belt portion 17 is pulled through the connector by the spring 40 in retractor 14.

Of course, the spring in the retractor is powerful enough to pull the lap belt portion 17 through the retractor when it is in the FIG. 3 orientation, but normally the lap belt portion 17 would have been adjusted during buckling.

It is recognized that the connector is maintained in its locked FIG. 3 orientation because of opposite forces pulling to the left on tongue 31 and to the right on belt portions 17 and 18. If desired, a small leaf spring may be located between the inside of the grip 35 and the back wall of the rear portion 33 of the tongue plate. A leaf spring is not shown in the preferred exemplary embodiment because it is not considered necessary in view of the normal pull on the connector from the belts and the buckle.

It will be understood that various modifications and changes may be made in the configuration described above which may come within the spirit of this invention and all such changes and modifications coming within the scope of the appended claims are embraced thereby.

We claim:

1. In a continuous loop restraint system for vehicles comprising a continuous loop of webbing anchored at a first end to the lower part of the vehicle and at its second end to the upper part of the vehicle and releasable anchor means releasably connecting the central portion of the webbing to the lower part of the vehicle on the other side of the user than the first mentioned anchor such that the portion of the webbing between the anchors at the lower part of the vehicle passes over the user's lower torso and the portion between the upper anchor and the releasable anchor passes over the user's upper torso, a retractor attached to the second end of the webbing to store excess webbing thereon, the improvement comprising the provision of:

said releasable connector including limiting means for allowing the webbing to pass therethrough only in a direction to shorten the webbing portion over the lower torso and lengthen the portion of the webbing over the upper torso.

2. The improvement of claim 1 further including the provision of means on the retractor for supplying additional force to the webbing to pull the webbing through the limiting means.

3. The improvement of claim 1, wherein said retractor further comprises tensionless means to relieve tension from said retractor on said webbing.

4. The improvement of claim 1 wherein said limiting means includes override means to allow webbing to pass in both directions through said limiting means.

5. In the system of claim 3 wherein said releasable anchor includes a buckle attached to the vehicle, a connector on the webbing, and override means on the connector to override said limiting means and allow said webbing to pass through said connector in both directions, the improvement comprising:

said override means has grip means which is held when said connector is held and which activates said override means when said connector is inserted in said buckle.

6. The restraint means of claim 5 wherein said grip means is connected to bar means, said bar means extending between part of the connector means, said webbing passing between said bar means and the part of said connector means to be gripped thereby, said bar means being movable to override the gripping of the webbing.

7. In a continuous loop restraint system for vehicles comprising a continuous loop of webbing anchored at a first end to the lower part of the vehicle and at its second end to the upper part of the vehicle and releasable anchor means releasably connecting the central portion of the webbing to the lower part of the vehicle on the other side of the user than the first mentioned anchor such that the portion of the webbing between the anchors at the lower part of the vehicle passes over the user's lower torso and is a lap portion and the portion between the upper anchor and the releasable anchor passes over the user's upper torso and is a shoulder portion, the improvement comprising the provision of:

limiting means on the releasable anchor operated by belt tension for normally limiting movement of said webbing relative to said releasable anchor in a direction loosening said lap portion when said lap portion is under tension; and retractor means attached to the second end of the webbing for storing excess webbing thereon, said retractor means including means for normally biasing said webbing in a direction to shorten said lap portion.

8. The improvement of claim 7 wherein:

said limiting means comprises a snubber bar over which said webbing is threaded to said releasable anchor and snubbing said webbing to said releasable anchor when said webbing between the anchor at the lower part of the vehicle is under tension for preventing lengthening of the lap portion when the lap portion is under tension;

housing means mounted about said releasable anchor and movable thereon; and means connecting said housing to said snubber bar to facilitate manual release of said snubbing of said webbing to allow manual adjustment of the location of said releasable anchor.

9. In the system of claim 8 wherein said releasable anchor comprises a connector on said webbing and a buckle attached to the lower part of the vehicle floor, the connector being releasably connectable to buckle, the connector comprising a tongue plate receivable in the buckle, the improvement comprising:

means for mounting said tongue plate for movement relative to said housing and snubber bar, said webbing being threaded about said snubber bar and through an opening in said tongue plate, said snubber bar being movable adjacent the wall of the opening in said tongue plate to snub said webbing between said wall of said opening and said snubber bar and said snubber bar being movable away from the wall of the opening to permit movement of said webbing over said snubber bar.

10. The improvement of claim 9 wherein said opening in said tongue plate comprises a front wall adjacent the part of said tongue plate which connects to said buckle and a back wall opposite to the front wall whereby tension on said lap portion pulls said snubber bar toward said rear wall of said tongue plate opening to snub said webbing and whereby force on said housing toward said buckle transmits movement to said snubber bar away from said rear wall to permit movement of said webbing through said connector.

11. The improvement of claim 7 further including the provision of means on the retractor for supplying additional force to the webbing to pull the webbing through the limiting means.

12. The improvement of claim 7 wherein said retractor further comprises tensionless means to relieve tension from said retractor on said webbing.

* * * * *